United States Patent [19]

Cleary, Jr. et al.

[11] Patent Number: 4,676,859

[45] Date of Patent: Jun. 30, 1987

[54] LABELING APPARATUS

[75] Inventors: Robert A. Cleary, Jr., Beacon, N.Y.; Theodore N. Zaccheo, Ramsey, N.J.

[73] Assignee: Labeling Systems, Inc., Monsey, N.Y.

[21] Appl. No.: 426,897

[22] Filed: Sep. 29, 1982

Related U.S. Application Data

[62] Division of Ser. No. 306,404, Sep. 28, 1981, abandoned.

[51] Int. Cl.[4] .................... B32B 31/00; B65H 26/00; B65C 9/40; B60K 41/24

[52] U.S. Cl. .................... 156/361; 156/363; 156/366; 156/541; 156/384; 226/29; 192/12 D; 242/75.52

[58] Field of Search .................... 192/12 R, 11, 12 D; 112/220, 121.27; 474/89, 88; 156/361, 363, 351, 368, 542, 541, 540, 584, DIG. 31, DIG. 38, 366, DIG. 28, DIG. 33, 367, 384, 494, 495; 226/29, 45, 38; 227/3; 242/75.51, 75.52, 75.44

[56] References Cited

U.S. PATENT DOCUMENTS

| | | | |
|---|---|---|---|
| 3,301,733 | 1/1967 | West et al. | 156/542 |
| 3,527,635 | 9/1970 | Paulsen et al. | 156/361 |
| 3,664,564 | 5/1972 | Stanton | 227/3 |
| 3,682,743 | 8/1972 | Cleary et al. | 156/384 |
| 3,729,362 | 4/1973 | French et al. | 156/542 |
| 3,736,208 | 5/1973 | Kraft et al. | 156/361 |
| 3,758,015 | 9/1973 | Stanton | 227/3 |
| 3,885,705 | 5/1975 | French | 156/542 |
| 3,984,277 | 10/1976 | French et al. | 156/541 |
| 4,035,808 | 7/1977 | Karp | 156/384 |
| 4,214,937 | 7/1980 | Geurtsen et al. | 156/475 |
| 4,405,403 | 9/1983 | Jodrey | 192/12 R |
| 4,411,393 | 10/1983 | Jodrey et al. | 226/29 |

*Primary Examiner*—Edward Kimlin
*Assistant Examiner*—L. Falasco
*Attorney, Agent, or Firm*—Lee C. Robinson, Jr.

[57] ABSTRACT

Apparatus for applying pressure sensitive labels to products on a product line peels the labels from a web of release paper and applies them to the products, when the latter are detected to be in a predetermined position, by action of a pneumatic applicator head. The head favorably includes an exhaust blower which vents to the atmosphere thereby keeping slitting dust out of the machinery cabinet, and is arranged to rock to an open, service position to expose compressed air hoses therewithin. These hoses are coupled to apertures in a base plate of the applicator head by venturi nozzles which serve to increase the pressure of compressed air pulses carried by the hoses for applying the labels to products. The web can be advanced over a peeling arrangement by a drive system including a drive roller powered by a two stage chain drive, with a clutch disposed between the two stages and a brake disposed directly with the drive roller. A preferred control circuit includes first to fourth timer circuits and an inhibiting circuit arrangement to ensure that multiple detections of a product during a label application cycle will not cause misoperation of the apparatus. An optional printer can be included to print additional information on the labels.

9 Claims, 17 Drawing Figures

FIG. 11
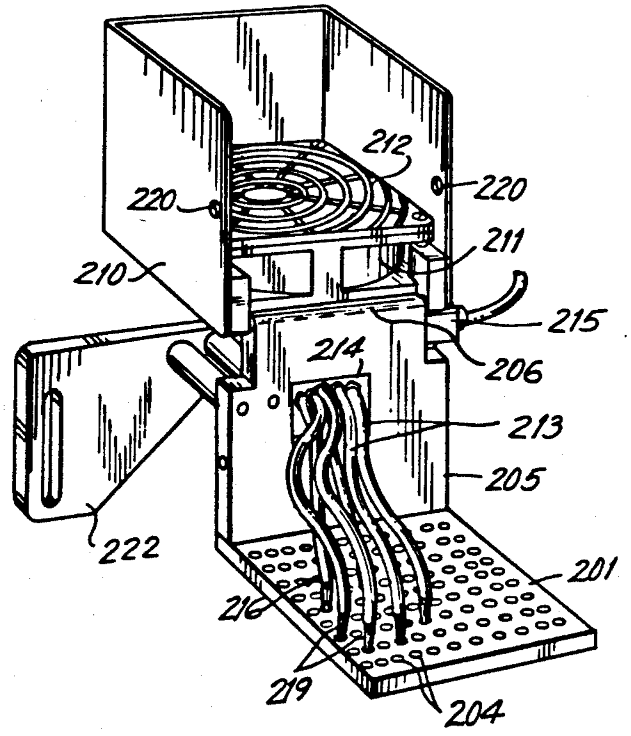
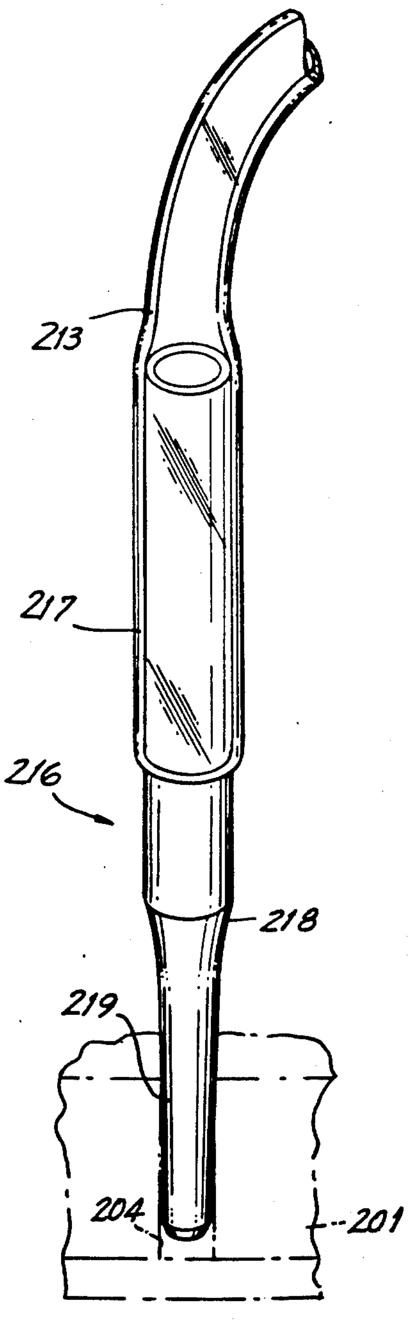
FIG. 12

LABELING APPARATUS

This is a division of application Ser. No. 306,404 filed Sept. 28, 1981, abandoned.

BACKGROUND OF THE INVENTION

1. Field of the Invention

This invention relates to apparatus for applying pressure-sensitive adhesive labels and is particularly directed to such apparatus wherein pressure sensitive labels are peeled from a web of release paper or other backing material and are thereafter applied to products of their containers in a conveyor line.

2. Brief Description of the Prior Art

Conventional label applicators for applying pressure-sensitive (PS) labels to articles generally draw a web of release paper or other release coated material over a knife-edge peeler, so that the labels are separated from the web. The separated labels can then be applied to the goods moving past.

The labels may be applied directly to the articles, but it is often preferable to use a label applicator head which can hold each separated label, for instance through the use of suction and from which the label is applied to a particular product when the latter moves to a predetermined position relative to the head.

Heretofore, labeling machines have been proposed incorporating a label applicator head having a vacuum housing with a grid formed of an open network of support members at one side thereof to receive the separated labels, a blower or suction pump to create a partial vacuum to hold the separated label against the open grid, and a compressed-air jet system to provide blasts of compressed air through air hoses with open ends disposed over the position of the label, so that the label is propelled away from the grid and against a product to be labelled.

Unfortunately, such machines have been constructed so that the vacuum housing has exhibited a number of deficiencies. For example, in several types of housings the labels were not positively and firmly held against the open grid during the appropriate portion of the machine cycle. In addition,the housing often was connected with a machinery cabinet enclosing the moving drive train for the machine, and slitting dust was drawn from the web through the applicator head and into the machinery cabinet. This slitting dust can lead to wear of the drive mechanism, and can cause misoperation of electrical and electronic control circuits for the labeling machine.

Further, in the conventional labeling machines, if compressed air is used to propel the label against an article, hoses are connected directly between the support members forming the open grid, and the distance which a label can be accurately and effectively propelled thereby is limited because of aerodynamic disruptions associated with the exit of the compressed air from the hoses.

Also, in the conventional labeling machines, access to the inside of the vacuum housing has been limited, thereby making it somewhat difficult for an operator to adjust the positions at the grid that the compressed air hoses are situated and to conform them with the particular shape of the labels being used.

It is convenient to supply the PS labels on a roll of release backing paper disposed on a reel or bobbin, and to mount the roll on a supply hub of the labeling machine. However, in order to retain the roll on the hub, a set-screw-type locking ring has been used. This type of locking ring requires special tools and makes if difficult for an operator to remove one roll of labels and install another.

Still further, it has been difficult to provide a labeling machine with accurate timing means to synchronize the feeding of the labels and the application of the labels onto the articles, while affording flexibility in the speed at which the product line can be run.

OBJECTS AND SUMMARY OF THE INVENTION

It is an object of this invention to provide labeling apparatus that overcomes the drawbacks of the conventional labeling machines.

It is another object of this invention to provide labeling apparatus in which slitting dust from the PS labels is kept away from the drive mechanism of the labeling apparatus.

It is a further object of this invention to provide labeling apparatus in which a label applicator head can be easily opened, for example, by removal of a screw or clamp therefrom to expose compressed air hoses therewithin to facilitate rearrangement of the hoses so that their locations conform with the specific geometry of the PS labels to be applied.

It is a further object of this invention to provide labeling apparatus incorporating venturi nozzles within a compressed-air applicator head to facilitate the accurate application of PS labels on products.

It is still another object of this invention to provide labeling apparatus having a two-stage chain drive system, with a clutch associated with the first stage and a brake associated with the second stage, to facilitate rapid and accurate feeding of PS labels.

It is yet another object of this invention to provide labeling apparatus in which a label supply roll can be quickly and securely mounted on a supply roll hub of the apparatus.

It is a still further object of this invention to provide labeling apparatus including a product sensor for detecting the position of products on a product line and improved control circuitry wherein multiple detections by the product sensor during a single application cycle will not cause misoperation of the apparatus.

Accordingly, labeling apparatus constructed according to several possible embodiments of this invention can be used for applying PS labels to products on a moving product line. Such labeling apparatus can comprise a supply roll containing a supply of the PS labels spaced on and releasably affixed to a web of backing material, such as release paper, a drive roller for drawing the web from the supply roll, a take-up spindle for taking up the web from the drive roller, a separating arrangement, such as a dispensing blade, for separating the labels from the backing material as the web is drawn in a path thereover by action of the drive roller, and an applicator head disposed adjacent the separating arrangement and also adjacent the product line for drawing each of the separated labels from the separating arrangement and thereafter applying the separated labels upon products when the latter are in a predetermined position adjacent the applicator head.

In an arrangement according to one aspect of this invention, the applicator head includes a base plate having a plurality of apertures arrayed therethrough and a plurality of alternating grooves and ridges on the side thereof on which the separated labels is situated extending parallel to the path of the label as it leaves the separating arrangement. A housing is positioned over the base plate to define a vacuum plenum, and an exhaust blower is disposed in the housing to create a partial vacuum in the vacuum plenum. A plurality of flexible hoses within the housing communicate between a compressed-air plenum and selected ones of the base plate apertures to provide pulses of compressed air through the apertures when the label is in position on the base plate. The exhaust blower exhausts to the atmosphere, thereby avoiding contact of slitting dust with the drive train for the labeling apparatus.

In a preferred arrangement, the housing rocks with respect to the base plate to open and expose the compressed air hoses within the housing, so that the hoses can be rearranged as appropriate for the shape of the particular labels to be applied. Also in several preferred embodiments, generally trumpet-shaped venturi nozzles are included at the base-plate end of the compressed air hoses. This feature not only facilitates insertion of the hoses into the base plate apertures, but also provides increased applicator burst pressure so that the PS label can be more securely applied to the product.

According to several embodiments of this invention, an improved locking ring is used with the supply roll. In one version of the improved locking ring, resilient members on the ring coact with flattened portions on the associated supply roll hub. In another version, a C-ring and lever arrangement is used.

In embodiments of this invention, it is preferred to use a two-stage chain drive for rotating the drive roller of the apparatus. In such case, a sprocket and clutch arrangement is used to connect the first and second chain drive stages. The second chain drive stage then rotates the drive roller, and the brake is coupled directly to the drive roller. With this arrangement, it is possible to start and stop the web advancement very quickly, thereby ensuring accurate feeding of the PS labels.

In several preferred arrangements, in which a printer may optionally be used to print additional data on the PS labels, control circuitry for the labeling apparatus can include a product sensor for detecting the presence of a product at a predetermined location, a label sensor for detecting the presence of a next-successive label at a predetermined position with respect to the label separating arrangement, first, second, third, and fourth timer circuits, and an inhibiting flip flop so arranged to prevent multiple detections of a product by the product sensor during a single application cycle from causing misoperation of the labeling apparatus. It is preferred that the time periods associated with each of the first through fourth timer circuits be adjustable so that the apparatus can be adapted to any of a variety of label sizes and productline speeds.

These and other objects, features, and advantages of the invention will become apparent from consideration of the ensuing description, when considered in conjunction with the accompanying drawings.

BRIEF DESCRIPTION OF THE DRAWINGS

FIG. 11 is a perspective view of the label applicator head of FIG. 1, reposed in an open, servicing position.

FIG. 12 shows detail of a portion of a compressed air applicator hose used in the head of FIG. 11.

DETAILED DESCRIPTION OF A PREFERRED EMBODIMENT

Figure 1:
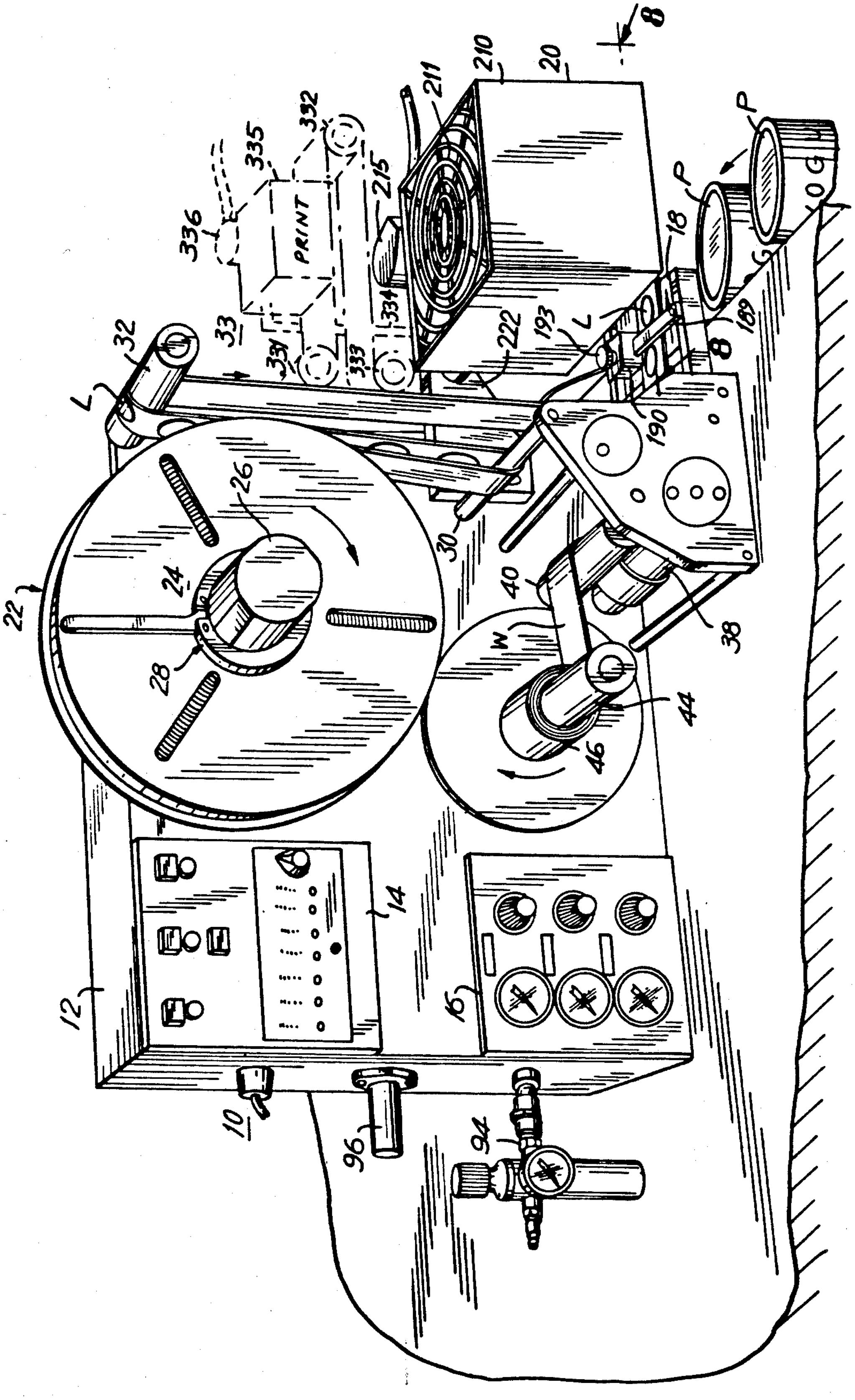
FIG. 1 is a perspective view of labeling apparatus embodying the present invention.
Figure 2:
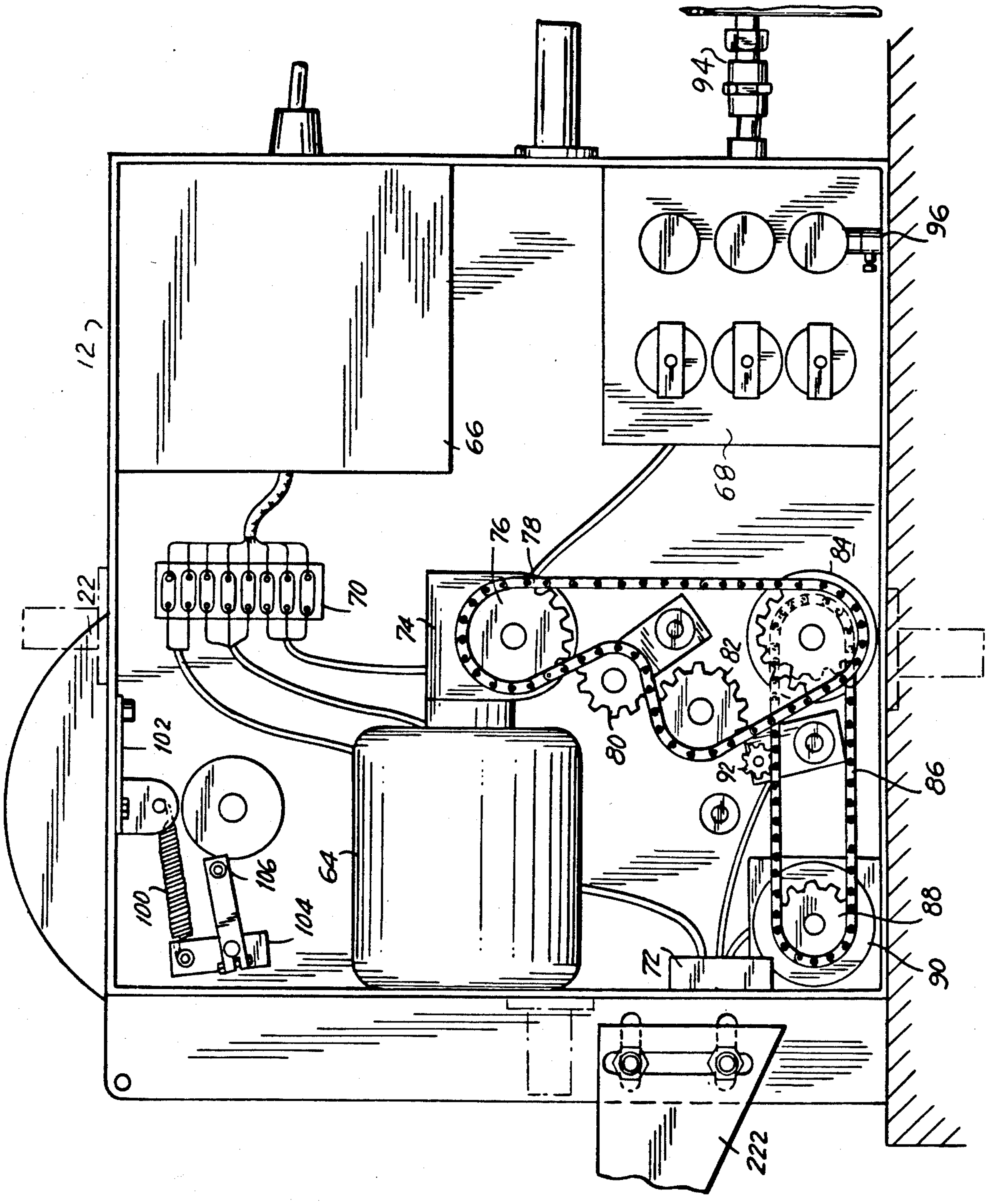
FIG. 2 is a rear view of the labeling apparatus of FIG. 1.
Figure 3:
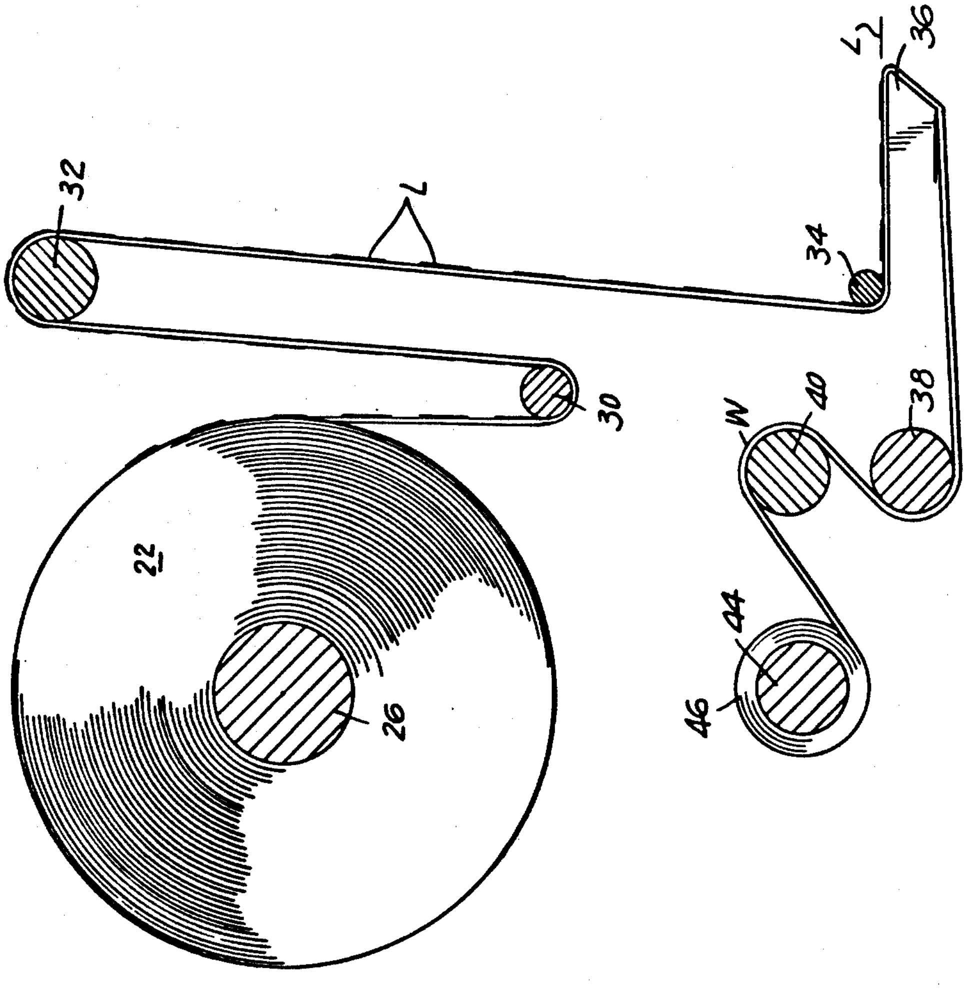
FIG. 3 shows the label-feed web-threading arrangement of the labeling apparatus of FIG. 1.

With reference to the drawings, FIG. 1-3 show labeling apparatus 10 according to one embodiment of this invention. Initially, the apparatus includes a cabinet 12 having an electircal panel 14 and a pneumatic panel 16 on the front thereof. The apparatus 10 further includes a peeler 18 or separating arrangement, and a label applicator head 20 disposed outboard of the cabinet 12 and adjacent the peeler 18 and also adjacent a line of products P arranged to proceed therepast for application of pressure sensitive (PS) labels L on an upper surface of each product P. A supply roll 22, including a web of release paper W having the PS labels L releasably affixed to one surface thereof, is rolled on a reel or bobbin 24 which is mounted on a supply roll hub 26 on the front of the cabinet 12. A locking ring 28, to be described in greater detail later, secures the bobbin 24 to the hub 26.

Figure 4:
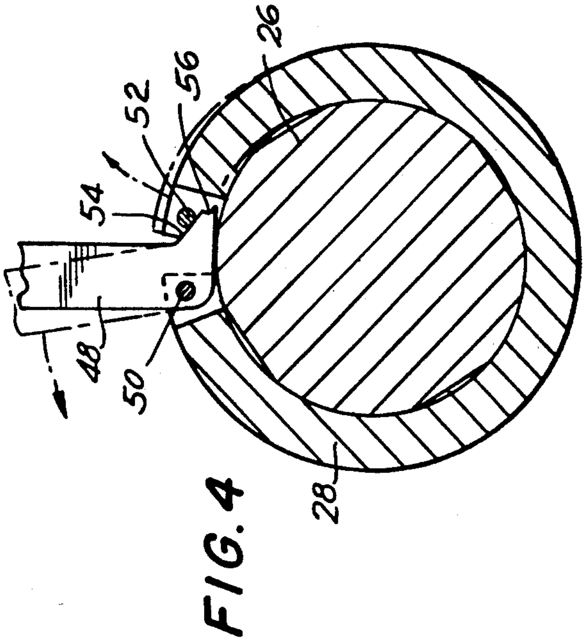
FIGS. 4 and 5 show supply roll locking ring arrangements according to this invention.
Figure 5:
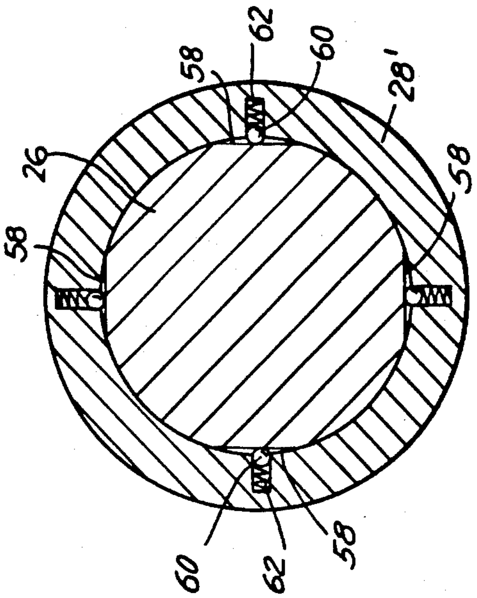

As perhaps better shown in FIG. 3, the web proceeds from the supply roll 22 around a guide roller 30, then over a dancer roller or tensing roller 32, to another guide roller 34. From there, the web proceeds over a knife edge 36 of the peeler 18 where it is bent sharply so that the labels L are separated therefrom. The separated web W is drawn past the knife edge 36 by a drive roller 38, and the web W passes around the drive roller 38 over a grip roller 40 and is gathered on a take-up spindle 44 as a waste roll 46. The locking ring 28 of this invention can be constructed, for example, as shown in FIG. 4, or alternatively, as shown in FIG. 5. The drive roller 38 and the take-up spindle 44 can be formed as rubber cylinders.

The locking ring 28 of FIG. 4 is formed of a C-ring whose normal diameter is slightly less than that of the hub 26, and includes a locking lever 48. The C-shaped locking ring 28 has pins 50 and 52 disposed at the circumferential end thereof facing one another across the gap therebetween. The locking lever 48 extends radially away from the hub 26 to pivot about the pin 50, and has a sloping cam portion 54 engaging the pin 52. If the lever is rotated (to the left in FIG. 4) the cam surface 54 pushes the pin 52 away from the pin 50, and thus spreads the ring 28 to a diameter greater than that of the hub 26. A half-moon cut-out 56 at the end of the cam surface 54 releasably engages the pin 52 when the ring 28 is fully spread to facilitate placement of the supply roll 22 over the hub 26. When the supply roll 22 is in place, the lever is moved to the right, disengaging the pin 52 from the cut-out 56, and thereby frictionally engaging the inner surface of the ring 28 with the hub 26.

An alternative arrangement of the locking ring is shown in FIG. 5. This locking ring 28' is adapted to cooperate with the hub 26 which has four flat surfaces 58 disposed 90° apart. Four steel balls 60 are disposed 90° apart at the inner diameter of the ring 28', and corresponding springs 62 bias the balls 60 radially inward. When this locking ring 28' is used with the supply roll 22, the latter is slipped in place over the hub 26 with the balls 60 aligned with the flat portions 58. Then, when the supply roll 22 is in place, the locking ring 28' is rotated so that the balls 60 are off the flat portions. The springs 62 will bias the balls 60 against the round part of the hub 26 and will be in firm frictional engagement therewith.

To remove the hub, it is only necessary to rotate the locking ring 28' so that the balls 60 are once again aligned with the flat portions 58. Then, the supply roll 22 will slip easily off the hub 26.

Returning to FIG. 2, the rear of the apparatus 10 is shown with a back panel (now shown) of the cabinet 12 removed. An AC drive motor 64, an electrical cabinet 66 and a pneumatic control cabinet 68 are positioned within the cabinet 12. The cabinets 66 and 68 are located in equal-size square openings in cabinet 12 so that they may be readily interchanged and orientated in any of 4 positions to facilitate their accessability to the operator of the machine. A wiring terminal block 70 is used to couple a wiring cable extending from the electrical cabinet 66 to a secondary wiring terminal block 72 and to the motor 64.

A drive system for rotating the drive roller 38 and the take-up spindle 44 includes the motor 64 and a two-stage chain drive arrangement coupled therewith. A gear head 74 reduces the speed of the output shaft of the motor 64 and drives a drive sprocket 76 thereof, which powers a first drive chain 78. The latter engages an adjustable idler sprocket 80, a take-up drive sprocket 82 associated with the take-up spindle 44, and a clutch sprocket assembly 84, which is better shown in FIG. 7. The sprocket assembly 84 couples the first drive chain 78 to a second drive chain 86 which engages a drive roller sprocket 88 associated with the drive roller 38 and an electric brake 90 therefor. An idler sprocket 92 provides tension adjustment of the second drive chain 86.

Also shown in FIG. 2 are a compressed air inlet arrangement 94 and an air assist compressed air valve 96, whose function will be described later.

Also disposed within the cabinet 12 is a friction brake disc 98 for the supply roll hub 26. A spring 100 is mounted between an anchor block 102 and a pivot arm 104 having a finger 106 thereon biased by the spring 100 against the rim of the disc 98.

Figure 6:
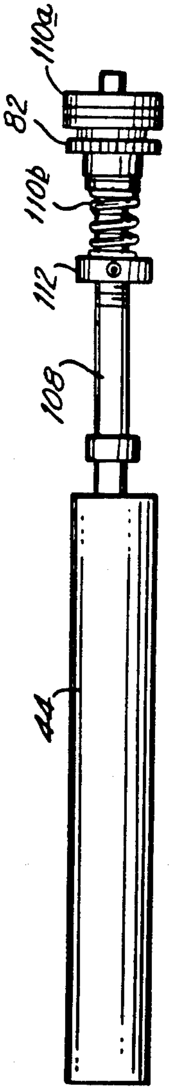

As shown in FIG. 6, the take-up spindle 44 and the take-up sprocket 82 are linked by an infinitely adjustable clutch assembly including a shaft 108 coupled to the take-up spindle 44, a friction plate assembly 110*a*, and a compression coil spring 110*b*. A nut 112 holds the spring 110*b* compressed against the sprocket 82 and friction plates 110*a*. The nut 112 can be turned to adjust the slipping torque as required for the particular width and stiffness of the backing paper web W. The nut 112 can be locked in place, for example, by means of a set screw disposed thereon.

Figure 7:
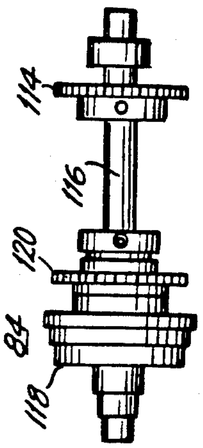
FIGS. 6 and 7 respectively show a take-up spindle assembly and a clutch and sprocket assembly used with several possible embodiments of this invention.

As shown in FIG. 7, the clutch and sprocket assembly 84 includes a sprocket 114 engaging the first drive chain 78, a shaft 116, an electric clutch 118, and a second sprocket 120. The latter co-acts with the sprocket 114 and the shaft 116 to pull the second drive chain 86 when the clutch 118 is engaged. The sprocket-clutch assembly 84 also provides an additional gearing stage.

The provision of the clutch 118 between the first and second drive chains 78 and 86 and of the brake 90 directly on the same shaft as the drive roller 38 ensures positive and precise starting and stopping of the web W, so that the labels L will be placed with accuracy on the base plate of the applicator head 20, even when the labels L are applied at high speed.

Figures 8, 10:
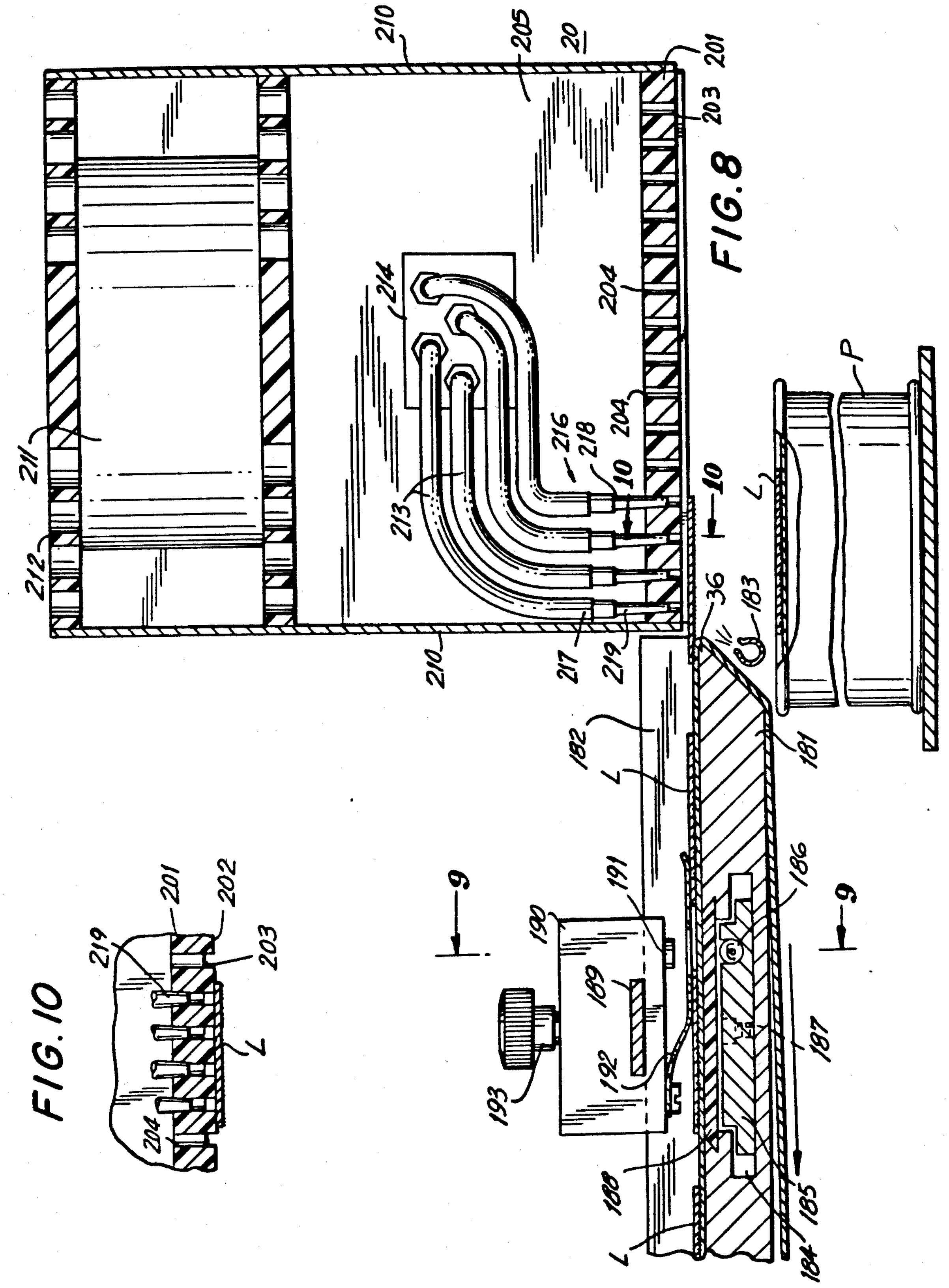
FIG. 8 is a sectional elevation of the label peeling arrangement and applicator head of the apparatus of FIG. 1, taken along the line 8—8 thereof.
FIG. 10 is a cross-sectional view taken along the line 10—10 of FIG. 8.
Figure 9:
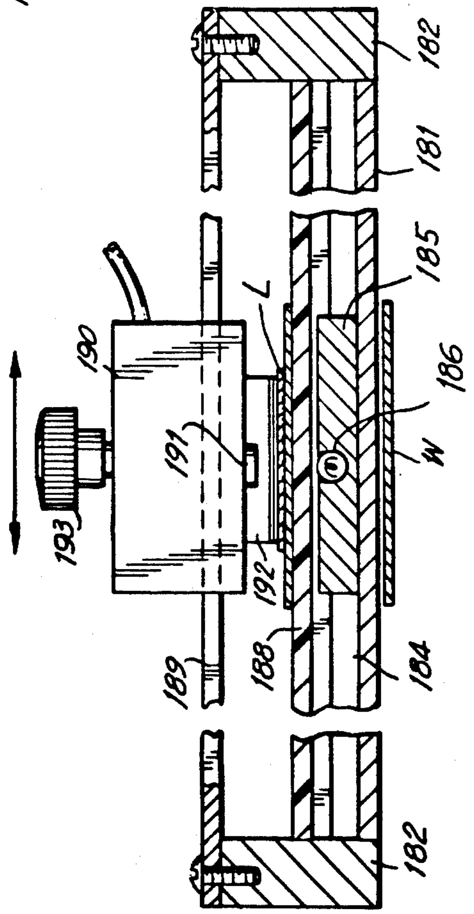
FIG. 9. is a cross-sectional view taken along the line 9—9 of FIG. 8.

The arrangment of the peeler 18 is shown in FIGS. 8 and 9. A principal component of the peeler 18 is a horizontal peeler blade 181 having the knife-edge 36 formed at an edge thereof adjacent the applicator 20. The knife edge 36 forms a sharp angle, here, approximately 45°, so that the label L which is somewhat stiffer than the web W will be separated therefrom as the web W is moved over the knife edge 36. Side plates 182 are disposed parallel to the path of the web W and on either side of the blade 181. An air assist tube 183 is disposed on a corner of one of the plates 182 beneath the knife edge 36. The air assist tube 183 is connected by flexible tubing to the compressed air valve 96 to provide a controlled stream of compressed air to aid the separated label L towards the applciator head 20.

A T-shaped cut out 184 extends the width of the blade 181 and contains an aluminum block 185 having a lamp 186 on an upper surface thereof. This block 185 can be moved laterally (i.e., left to right in FIG. 9) and when the same is in its desired position, it can be locked in place by a set screw 187 which pushes the block 185 against the cross arm portions of the T-shaped cut out 184. A transparent plastic sheild 188 covers the T-shaped cut out and keeps slitting dust from the labels L away from the lamp 186.

A transverse sensor-mounting bar 189 extends over the blade 181 from upper edges of the side plates 182. A sensor housing block 190 is slidably mounted on the bar 189 and has a photo-transistor 191 disposed on a lower surface thereof so as to face the lamp 186 through the plastic shield 188 and the web W.

A hold-down spring 192 is also disposed on the lower surface of the sensor housing block 190 to press the web W and labels L onto the blade 181 to ensure that the web is flat as it approaches the knife edge 36. An aperture or cut-out is provided in the hold-down spring 192 at the position directly beneath the photo-transistor 191 so that light can pass therethrough. A knob 193 on the top of the block 190 is turned down to hold the block 190 in place when the desired horizontal position of the photo-transistor 191 is achieved.

The applciator head 20 of this application is shown in detail in FIG. 8, and also in FIGS. 10, 11, and 12.

A base plate 201 is disposed a short distance, e.g. 1/32 inch, above the knife edge 36 and parallel to the separated labels L as they leave the knife edge 36. The base plate 21 is provided with longitudinal ridges 202 and grooves 203 (FIG. 10) in the direction parallel to the path of the labels L and has an array of apertures 204 extending through it and aligned with the grooves 203.

A back plate 205, as better shown in FIG. 11, is affixed to the base plate 201, and has a hinge portion 206 at the top edge thereof. A shroud 210, here formed of sheet metal, such as chrome-plated or zinc-chromate-plated steel, extends from the base plate 201 to an exhaust blower 211. The shroud 210 is fastened to a frame 212 of the blower 211 and the frame 212 is hingedly connected to the hinge portion 206 of the back plate 205.

In the illustrated embodiment, the frame 212 of the exhaust blower 211 has substantially the same shape as the perforated base plate 201. The shroud 210, the exhaust blower 211, the base plate 201, and the back plate 205 together form a vacuum housing, and the exhaust blower 211 creates a partial vacuum therein by exhausting to the atmosphere. The shroud 210 and blower 211 can be rocked at the hinge portion 206 to the eposition illustrated in FIG. 11 to open the vacuum housing to an open, or service position.

Within the applicator head 20 are a plurality of flexible hoses 213 connected to a compressed air manifold 214 on the back plate 205. An electric compressed air valve 215 provides a pulse of compressed air through the manifold 214 to the hoses 213. The valve 215 is mounted external to the head 20 and to the cabinet 12 to facilitate the servicing and adjustment thereof. The hoses 213 are also connected to predetermined apertures 204 in the base plate 201 by means of venturi nozzles 216 which are illustrated in more detail in FIG. 12.

As shown in FIG. 12, each of the venturi nozzles 216 includes a cylindrical body 217, a tapered funnel portion 218, and a nose 219 which is inserted into a respective base plate aperture 204. The flexible plastic hoses 213 are preferably stretch-fit over the cylindrical body portion 217. The generally trumpet-shaped venturi nozzles 216 serve to increase the application efficiency of the air pulses provided through the base plate apertures 204 onto the separated labels. L. When a compressed air pulse is provided from the compressed air valve 215 at a pressure of, for example, 80 PSI, the applicator air pressure provided from the nose 219 of the venturi nozzle will have a substantially greater pressure.

As is further shown in FIG. 11, screw holes 220 and 221 are respectively provided through the shroud 210 and in the back plate 205 so that when the shroud 210 is closed over the base plate 201 and back plate 205, the housing can be fastened together with a single pair of screws.

As is further shown in that view, a mount 222 is provided to adjustably attach the applicator head 20 to the cabinet 12.

Figure 13:
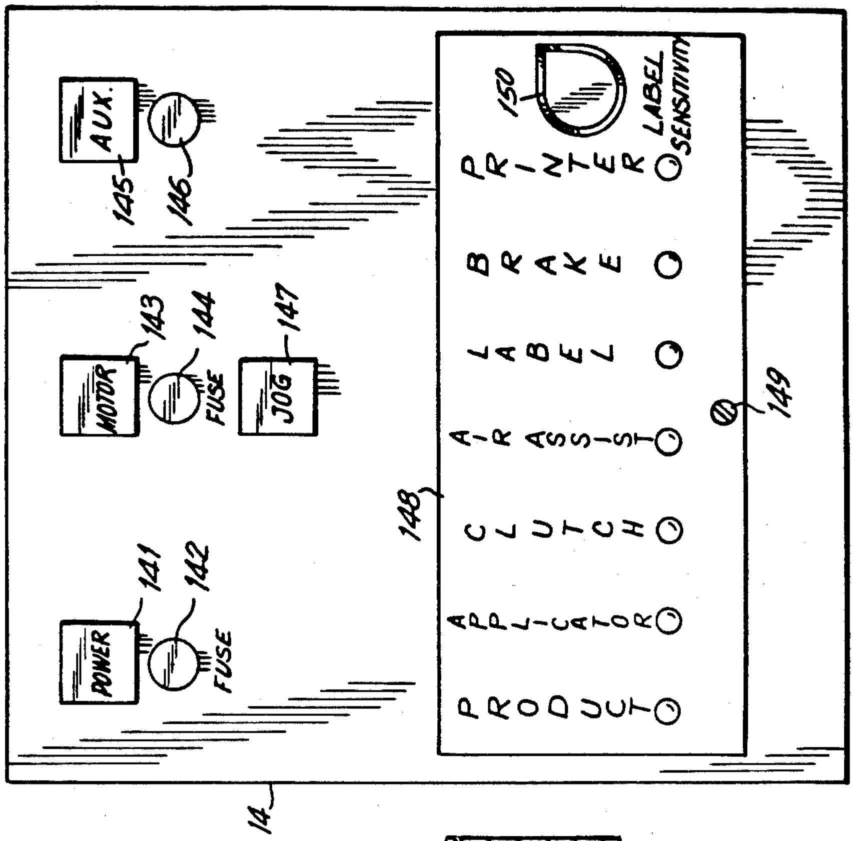
FIG. 13 shows the exterior of an electrical panel of the apparatus of FIG. 1.

Detail of the electrical panel 14 of the apparatus is illustrated in FIG. 13. A power switch/pilot lamp 141 and an associated power fuse 142 are provided for the main power. A separate motor switch/pilot light 143 and fuse 144 are provided for the AC power to the motor 64, and an auxiliary switch/pilot lamp 145 and its associated fuse 146 for AC power supplied to an auxiliary outlet (not shown) are also provided.

A jog switch 147 is also provided on the panel 14. This switch 147 is used to actuate a jog operation, in which labels are run for only a brief period of time, for example, in order to adjust the positioning of the head 20 or to change the label feed timing.

A pull-out indicator panel 148 has indicators which are lit to show the operation of a product sensor, the applicator, clutch, air assist, label sensor, brake, and printer, respectively. The panel is held by a locking screw 149. A sensitivity control 150, for example, a potentiometer, controls the intensity of the lamp 186.

Figure 14:
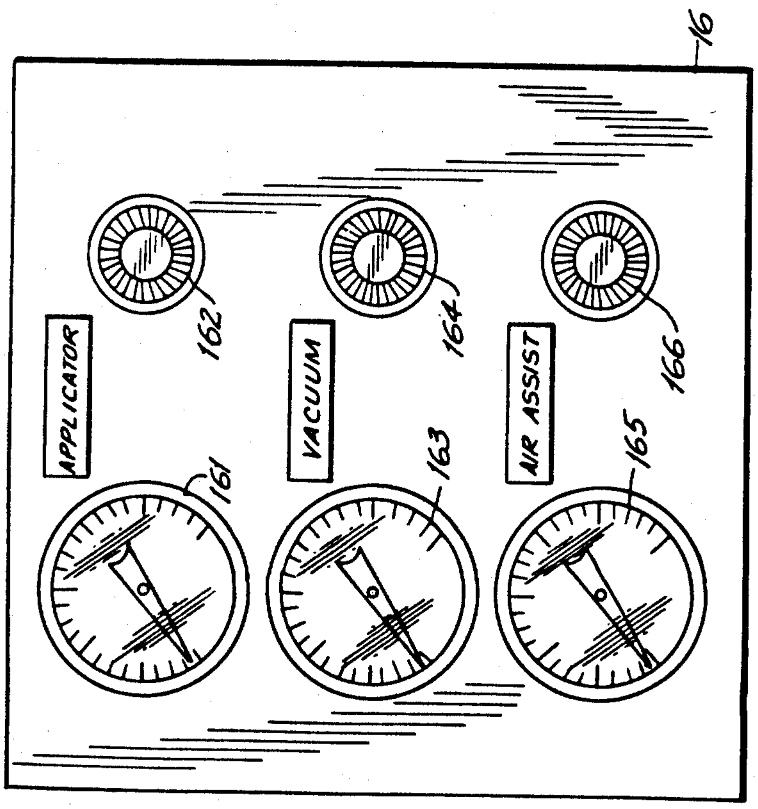

FIG. 14 shows one possible arrangement of the pneumatic panel 16. Here an applicator pressure gauge 161 and an applicator adjustment knob 162 are provided for monitoring and adjusting the pressure of the compressed air pressure supplied to the applicator valve 215. A vacuum gauge 163 and vacuum adjusting knob 164 can also be provided. This gauge 163 and knob 164 are not strictly necessary when the head 20 is used, but would come into play if a piston-type applicator were used. An air assist gauge 165 and an adjusting knob 166 are used to monitor and control the air pressure associated with the air assist tube 183.

Figure 15:
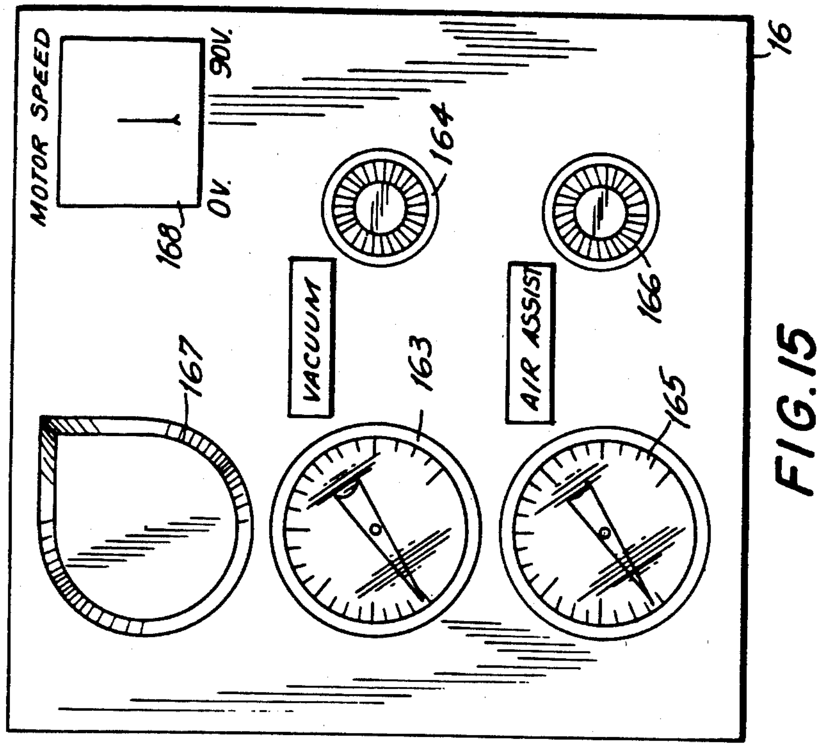
FIGS. 14 and 15 show the exterior of alternative pneumatic panels of apparatus embodying this invention.

A variation of the above pneumatic panel 16 could be provided as shown in FIG. 15, if a DC motor were used in place of AC motor 64. In that case, a speed-adjusting potentiometer 167 would be included to control the voltage to the motor and an associated motor speed indicator 168 would provide an indication of the motor supply voltage, or alternatively, of the corresponding motor speed.

Figure 16:
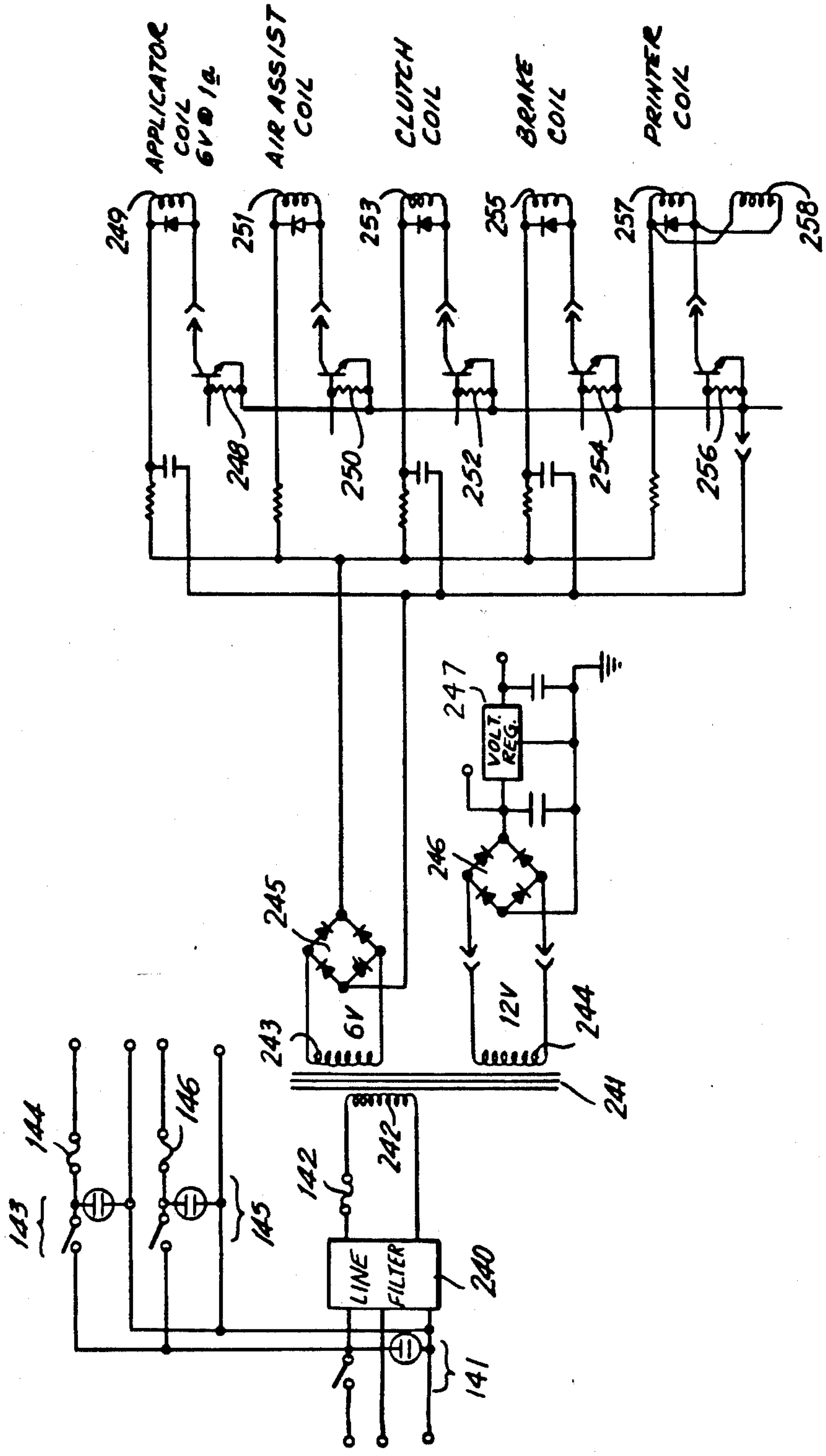
FIG. 16 and 17 are circuit diagrams showing electrical control circuitry according to one embodiment of the invention.

The power supply circuit arrangement used with the preferred embodiment of FIG. 1 is illustrated in FIG. 16. Here an AC line filter is shown to be interposed between the main power switch 141 and the fuse 142. A step-down transformer 241 has its primary 242 connected to the line filter 240 and secondaries 243 and 244 coupled to respective rectifier bridges 245 and 246. The latter is followed by a voltage regulator 247 to provide a supply to the electronic control circuitry to be described hereafter. The bridge 245 provides DC actuator power to an applicator drive transistor 248 and an associated applicator coil 249 (disposed in the applicator valve 215), to an air assist drive transistor 250 and an associated air assist coil 251, to a clutch drive transistor 252 and an associated clutch coil 253 in the electric clutch 118, to a brake drive transistor 254 and an associated brake coil 255 in the electric brake 90, and to a printer drive transistor 256 and its associated printer coil 257 and an external coil 258 associated therewith. The printer coil 257 is included in an optional printer 33, to be described later.

Figure 17:
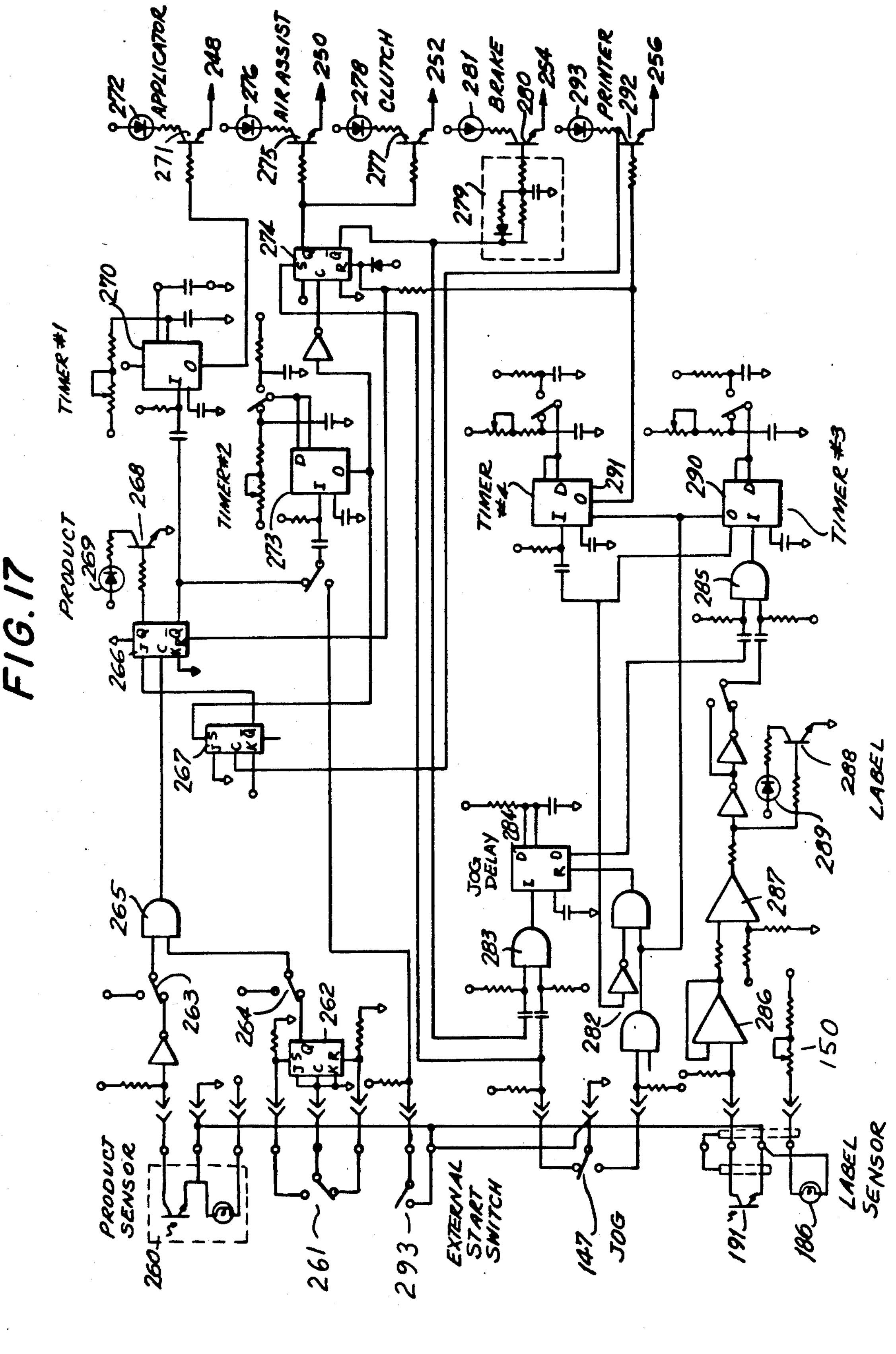

The control circuitry for the embodiment of FIG. 1 is shown in detail in FIG. 17.

A photo-electric product sensor 260 and a mechanical product sensor, formed of a switch 261 with as associated flip-flop 262 thereafter, can be used either independently or in conjunction with each other to detect the presence of a product P on the product line when the product P is in a position directly beneath the base plate 201 to receive a product label L. The sensors 260 and 261 are coupled through respective switches 263 and 264 to inputs of a logic gate 265. The output thereof is provided to a clock input of a flip-flop 266. The inverted output $\overline{Q}$ of another flip-flop 267 is coupled to another input of the flip-flop 266. The output Q of the flip-flop 266 is coupled through a drive transistor 268 to power a product LED 269. The inverted output $\overline{Q}$ of the flip-flop 266 is provided to an input of a first timer circuit 270, whose period is adjustable, for example, from 25 to 2400 msec. The output of the first timer circuit 270 is coupled to control a drive transistor 271 to turn on an applicator LED 272, and to drive the applicator drive transistor 248. The inverted output $\overline{Q}$ of the flip-flop 266 is also coupled to an input of a second timer circuit 273 whose period is adjustable, for example, from 50 to 1100 msec. The output of the second timer circuit 273 is coupled to a set terminal of the flip-flop 267 and also to a clock input of another flip-flop 274. This flop-flop 274 controls the actuation of the brake 90 and the clutch 118, as well as the actuation of the air assist operation. The uninverted output Q of the flip-flop 274 is coupled to control a transistor 275 to turn on an air assist LED 276 and also to acutate the air assist drive transistor 250. This output Q is also coupled to drive another transistor 277 to turn on a clutch LED 278 and also to actuate the clutch drive transistor 252. The inverted output Q of the flip-flop 274 is coupled through a brake compensation circuit 279 to drive a transistor 280 to turn on a brake LED 281 and also to drive the brake drive transistor 254.

As is also shown in FIG. 17, the jog switch 147 is coupled through logic circuitry 282 to a reset terminal of a jog delay 284 and is also coupled through a logic gate 283 to an input terminal of the delay 284. The inverted output $\overline{Q}$ of the flip-flop 274 is also coupled to an input of the logic circuit 283. An output of the delay 284 is coupled to an input of another gate 285.

The label-sensor photo transistor 181 is coupled through first and second amplifiers stages 286 and 287 to a transistor 288 to turn on a label LED 289 whenever the photo transistor 191 is directly over the leading edge of a label L on the web W. The amplifier stage 287 is also coupled through the gate 285 to an input of a third timer circuit 290, and the output of the latter is coupled to the input of a fourth timer circuit 291. The fourth timer circuit 291 has its output coupled to a transistor 291 to turn on a printer LED 293 and also to drive the printer drive transistor 256. The output of the fourth timer circuit 291 is also provided to the reset terminals of the flip-flops 266 and 274 and is further provided, through the collector terminal of the transistor 292, as an inverted signal to a clock input terminal of the flip-flop 267. An external start switch 293 can be used to manually actuate a label-feed operation.

Returning to FIG. 1, the optional printer 33, shown in ghost lines, can be disposed at any convenient position along the path of the web W between the supply roll 22 and the peeler 18. In the illustrated arrangement, the printer 33 is disposed between the dancer roll 32 and the guide roller 34. Here the web W is diverted around rollers 331, 332, and 333, which are mounted on a standard 334 behind the applicator head 20. A printer head 335, which can be, for example, an ink jet printer, is here also mounted on the standard 334 and is disposed between the rollers 331 and 332. A printer air valve 336 applies compressed air to the printer 336 at selected times when current is applied to the coil 257. The inclusion of the printer 33 permits additional information to be included on the label, such as price or weight or size of the product P to which the label L is to be applied.

The operation of the labeling apparatus can be briefly described as follows. The labels are fed one at a time from the peeler 18 to the base plate 201 of the applicator head 20, and a separated label L is vacuum held, adhesive side down, against the base plate 201 by reason of the partial vacuum created by the exhaust blower 211. When a product P on the product line moves into a predetermined position directly beneath the separated labels L on the base plate 201, the product sensor 260 or 261 is actuated, thereby causing the product LED 269 to light and also starting the cycle of the first timer circuit 270. This timer circuit 270 opens the applicator air valve 215 for the predetermined period and a blast of compressed air is forced through the venturi nozzles 216 against the top of the label L. This blast overcomes the holding force of the partial vacuum and causes the label L to be placed accurately on the top surface of the product P even if that surface is up to several inches from the base plate 201.

A predetermined time after the product sensor 260 or 261 is actuated, as determined by the period of the second timer circuit 273, the clutch 118 and the air assist operation are both actuated, and the brake 90 is released. Thus, at this time, the web is advanced forward, and a next successive label is brought to the lower surface of the base plate 201. When the photo transistor 191 detects the front edge of a next-successive label to pass beneath it, the label LED 289 is lit and the third timer circuit 290 is started. A brief period thereafter, i.e., the period of the third timer circuit 290, the output of the fourth timer circuit 291 changes from low to high and remains high for the fourth period of time, to permit the printer, if required, to carry out its operation. Then, the output of the fourth timer circuit 291 becomes low. The flip-flop 274, being reset at the end of the third period, causes the clutch 118 to disengage and the brake 90 to engage at a time equal to the third period following the detection of the next successive labels by the photo transistor 171. Thereafter, when the fourth period and the associated printer operation are over, the flip-flop 267 changes state, thereby conditioning the first flip-flop 266 to receive a next successive signal from the product sensor 260 or 261.

In the operation of the apparatus of this invention, the second timer circuit 273, the third timer circuit 290 and the fourth timer circuit 291 act in conjunction with the flip-flops 266 and 267 to inhibit the first timer circuit 270 from actuating the applicator coil 249 of the applicator air valve 215 until an entire application cycle has been completed, that is, until the fourth period (of the fourth timer circuit 291) has expired. This prevents multiple detections by the product sensor 260 or 261 during a single application cycle from causing misoperation of the labeling apparatus.

The periods of the respective timers 270, 273, 290, and 291 can be adjusted as required for the respective label size, distance from base plate 201 to products P, product line speed, and printer speed.

The job switch 147 and the associated jog relay 284 cause the apparatus to feed out one label at a time when the switch 147 is actuated momentarily. If the switch 147 is held down, for instance to check the adjustment of the labeling apparatus 10, the labels L will be fed continuously for approximately two seconds, and then the apparatus will automatically stop.

By adjusting potentiometers associated with the respective timing circuits 270, 273, 290, and 291, the length of the applicator air pulse, clutch feed delay time, the label stop position, and the printer dwell time can be precisely adjusted.

It should also be appreciated that the externally mounted applicator head 20 can be adjusted vertically to accomodate odd-shaped products on the product line.

Further, while the embodiment described above shows a "right handed" version of the labeling apparatus of this invention, it would be a simple matter to construct left handed apparatus or vertically-oriented labeling appartus employing exactly the same principles. In addition, it should be noted that the labeling apparatus of this invention can accommodate a wide variety of label widths and virtually and shape of label L can be applied with the apparatus of this invention.

Also, while the shroud 210 of the application head 20 of this embodiment is held in place by screws, placed in the screw holes 220 and 221, it would be a simple matter to use other fastening means, such as an over-the-center clamp to accomplish the same purpose. In fact, in some instances, the shroud 210 can be held closed by gravity only.

Additionally, a variety of other possible dispensing arrangements can be employed in place of the peeler 18 as particularly described herein.

While an illustrative embodiment of this invention has been described above with reference to the accompanying drawings, it will be apparent to those skilled in the art that the invention is not limited to that precise embodiment, and that numerous changes and modifications may be effected therein without departure from the scope or spirit of the invention as defined in the appended claims.

We claim:

1. Labeling apparatus for applying pressure-sensitive labels to products on a moving product line comprising supply means containing a supply of said pressure sensitive labels spaced on and releasably affixed to a web of backing material; a drive spindle for drawing said web from said supply means; a take-up spindle for taking up said web from said drive spindle; two-stage drive linkage means including a first gearing stage and a second gearing stage for respectively powering said take-up spindle and said drive spindle; separating means for separating said labels from said backing materials as said web is drawn thereover by said drive spindle; and applicator head means disposed adjacent said separating means and adjacent said product line for drawing each said separated label from said separating means and holding and thereafter applying said separated label upon a product when the latter is in a predetermined position adjacent said applicator head means; wherein said two-stage drive linkage means includes motive means providing substantially continuous rotary motive power, a drive sprocket coupled to rotate with said motive means, a first drive chain driven by said drive sprocket, a take-up sprocket in said first gearing stage coupled to said take-up spindle and driven by said first drive chain; the second gearing stage including an electric clutch assembly having a primary drive sprocket driven by said first drive chain, a secondary drive sprocket coaxial therewith and electric clutch means selectively coupling said primary and secondary drive sprockets, a second drive chain driven by said secondary drive sprocket, a driven sprocket driven by said second drive chain and coupled to said drive spindle to drive the same, and braking means coupled directly to said driven sprocket and said drive spindle for selectively braking the latter.

2. Labeling apparatus according to claim 1, further comprising product sensor means to detect when said product is in its predetermined position. Label sensor means disposed at said separating means to detect when said web has been advanced to a point corresponding to the presence of a next successive label thereon, and electronic control means having inputs coupled to said sensor means and outputs coupled to said brake means, said clutch means, and said applicator head means so that when said product is detected to be in its predetermined position, a separated label held on said applicator head means is applied by it to said product, following which the clutch means is engaged and the brake means is disengaged until the next-successive label is detected, so that a new label is separated from said backing material and drawn into a ready position on said applicator head means.

3. Labeling apparatus for applying pressure-sensitive labels to products on a moving product line comprising supply means containing a supply of said pressure-sensitive labels spaced on and releasably affixed to a web of backing material; a drive spindle mounted on a first shaft for drawing said web from said supply means; a take-up spindle mounted on a second shaft for taking up said web from said drive spindle; two-stage drive linkage means including a first gearing stage and a second gearing stage for respectively powering said take-up spindle and said drive spindle; separating means for separating said labels from said backing material as said web is drawn thereover by said drive spindle; and applicator head means adjacent said separating means and adjacent said product line for drawing each said separated label from said separating means, and holding and thereafter applying said separated label upon a product when the latter is in a predetermined position adjacent said applicator head means; wherein said two-stage drive linkage means includes motive means providing substantially continuous rotary motive power, a drive sprocket coupled to rotate with said motive means, a first drive chain driven by said drive sprocket, a take-up sprocket driven by said first drive chain, an infinitely-variable slip clutch mounted on said second shaft, said slip cluch including a friction plate assembly, a compression coil spring and a locking nut slideably mounted on said shaft for adjustably holding the spring against the plate assembly, said clutch linking said take-up sprocket to said take-up spindle, an electric clutch assembly having a primary drive sprocket mounted on a third shaft driven by said first drive chain, a secondary drive sprocket coaxial therewith, and electric clutch means selectively coupling said primary and secondary drive sprockets through said third shaft, a second drive chain driven by said secondary drive sprocket, a driven sprocket driven by said second drive chain and coupled by said second shaft to said drive spindle to drive the same, and braking means coupled directly to said driven sprocket and said drive spindle for selectively braking the latter.

4. Labeling apparatus according to claim 3, wherein said take-up spindle includes a generally cylindrical rubber roller about which said web is to be wound.

5. Labeling apparatus for applying pressure-sensitive labels to products on a moving product line comprising supply means containing a supply of said pressure-sensitive labels spaced on and releasably affixed to a web of backing material; drive roller means mounted on a first shaft for drawing said web from said supply means; take-up means mounted on a second shaft for taking up said web from said drive roller means; separating means for separating said labels from said backing material as said web is drawn thereover by said drive roller means; two-stage drive linkage means for selectively powering said drive roller means and including clutch means and brake means disposed on separate shafts for selectively applying rotary power to said drive roller means and stopping the same, respectively; product sensor means for detecting when a product is in a predetermined position on said product line; label sensor means disposed at said separating means for detecting when said web has been advanced to a point corresponding to the presence of a next successive label thereon; applicator head means disposed adjacent said separating means and adjacent said product line for drawing each said separated label from said separating means, and holding and thereafter applying said separated label upon a product when the latter is in said predetermined position, the applicator head means including a base plate having a plurality of apertures arrayed therethrough, a housing over said base plate to define a vacuum plenum, an exhaust blower in said housing, air pulse means for selectively providing bursts of compressed air, and flexible hose means coupling said air pulse means with a plurality of said apertures of said base plate; and control circuit means having inputs coupled to said product sensor means and to said label sensor means, respectively, outputs coupled to said air pulse means and to said clutch means and brake means, respectively, first timing circuit means having an input coupled with said proudct sensor means and a delayed output coupled to the output associated with said air pulse means, and second timing circuit means having an input coupled to said label sensor means and a delayed output coupled to said label sensor means and a delayed output coupled to the output associated with said brake means and clutch means.

6. Labeling apparatus according to claim 5, wherein said apparatus further comprises printer means for printing information on said labels while on said web, and said second timing circuit includes a second output coupled to said printer means to supply a print command to the same and means to inhibit release of said brake means and engagement of said clutch means until said print command has ceased.

7. Labeling apparatus for applying pressure sensitive labels on a moving product line comprising supply means containing a supply of said pressure-sensitive labels spaced on and releasably affixed to a web of backing material; drive roller means mounted on a first shaft for drawing said web from said supply means; take-up means mounted on a second shaft for taking up said web from said drive roller means; separating means for separating said labels from said backing material as said web is drawn thereover by said drive roller means; two-stage drive linkage means including a plurality of gearing stages for selectively powering said drive roller means and including clutch means and brake means disposed on separate shafts for selectively applying rotary power to said drive roller means and stopping the same, respectively; product sensor means for detecting when a product is in a predetermined position on said product line; label sensor means disposed at said separating means for detecting when said web has advanced to a point corresponding to the presence of a next successive label thereon; applicator head means disposed adjacent said separating means and adjacent said product line for drawing each said separated label from said separating means and holding and thereafter applying said separated label upon a product when the latter is in said predetermined position; a printer for printing information on said labels when affixed to said web of backing material; and control circuit means comprising a first timer circuit providing an actuating signal to said applicator head means for a first predetermined period of time following detection of a product by said product sensor means; a second timer circuit to supply a start signal a second predetermined period of time following detection of said product by said product sensor means to release said brake means and engage said clutch means thereby to begin advancement of said web past said separating means, a third timer circuit to supply a stop signal a third predetermined period of time following detection of said next-successive label by said label sensor means; a fourth timer circuit to supply a print command to said printer for a fourth predetermined period of time following said third predetermined period of time and to engage said brake means and relase said clutch means; and inhibit circuit means coupled to said fourth timer circuit and to said product sensor means for inhibiting said first timer circuit means from providing said actuating signal until said fourth predetermined period of time is expired, thereby preventing multiple detections by said product sensor means during a single application cycle from causing misoperation of the apparatus.

8. Labeling apparatus according to claim 7, wherein each of said first, second, third, and fourth periods of time is selectively adjustable.

9. Labeling apparatus according to claim 7, further comprising respective indicator lights to show actuation of said applicator means, said clutch means, said brake means, and said printer.

* * * * *